US012441110B2

(12) United States Patent
Koike et al.

(10) Patent No.: US 12,441,110 B2
(45) Date of Patent: Oct. 14, 2025

(54) LIQUID EJECTING HEAD, LIQUID EJECTING APPARATUS, AND PIEZOELECTRIC DEVICE

(71) Applicant: SEIKO EPSON CORPORATION, Tokyo (JP)

(72) Inventors: Harunobu Koike, Matsumoto (JP); Takashi Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 195 days.

(21) Appl. No.: 18/322,379

(22) Filed: May 23, 2023

(65) Prior Publication Data

US 2023/0382113 A1 Nov. 30, 2023

(30) Foreign Application Priority Data

May 25, 2022 (JP) ................................ 2022-085518

(51) Int. Cl.
*B41J 2/14* (2006.01)

(52) U.S. Cl.
CPC ................................ *B41J 2/14233* (2013.01)

(58) Field of Classification Search
CPC .......... B41J 2/14233; B41J 2002/14419; B41J 2202/11; B41J 2002/14241; B41J 2/14201
See application file for complete search history.

(56) References Cited

U.S. PATENT DOCUMENTS

2021/0031518 A1* 2/2021 Fujioka .................. B41J 2/1629
2021/0362501 A1* 11/2021 Shimizu .................. B41J 2/025

FOREIGN PATENT DOCUMENTS

JP 2008-078407 A 4/2008
JP 2019-204834 A 11/2019
JP 2021-181206 A 11/2021

* cited by examiner

*Primary Examiner* — Lisa Solomon
(74) *Attorney, Agent, or Firm* — WORKMAN NYDEGGER

(57) ABSTRACT

A vibration plate includes a first layer containing silicon as a constituent element, a second layer containing a metal element other than zirconium as a constituent element, and a third layer containing zirconium as a constituent element. When a region of the vibration plate that overlaps with the pressure chamber and overlaps with the first electrode, the piezoelectric body layer, and the second electrode is an active region, and a region of the vibration plate that overlaps with the pressure chamber and does not overlap with the first electrode, the piezoelectric body layer, and the second electrode is an inactive region, the vibration plate has the first layer, the second layer, and the third layer in the active region, and has the first layer and the second layer and does not have the third layer in at least part of the inactive region.

20 Claims, 7 Drawing Sheets

LIQUID EJECTING HEAD, LIQUID EJECTING APPARATUS, AND PIEZOELECTRIC DEVICE

The present application is based on, and claims priority from JP Application Serial Number 2022-085518, filed May 25, 2022, the disclosure of which is hereby incorporated by reference herein in its entirety.

BACKGROUND

1. Technical Field

The present disclosure relates to a liquid ejecting head and a liquid ejecting apparatus that have an piezoelectric element including a first electrode, a piezoelectric body layer, and a second electrode, a vibration plate vibrated by driving of the piezoelectric element, and a pressure chamber substrate that defines a pressure chamber where pressure is applied to liquid by the vibration of the vibration plate, and also relates to a piezoelectric device having a piezoelectric element and a vibration plate.

2. Related Art

An ink jet recording head is known as a liquid ejecting head which is one of electronic devices. An ink jet recording head includes a pressure chamber substrate provided with pressure chambers communicating with nozzles, a vibration plate provided at one surface side of the pressure chamber substrate, and piezoelectric elements provided on the vibration plate, and ejects ink droplets from the nozzles by driving the piezoelectric elements to cause a pressure change to the ink in the pressure chambers.

There are various configurations for the vibration plate. In one example, the vibration plate includes an elastic film containing silicon as a constituent element and an insulating film containing zirconium as a constituent element. For example, there is a vibration plate formed by a stack of a first vibration layer (an elastic film) formed of silicon oxide ($SiO_2$) and a second vibration layer (an insulating film) formed of zirconium oxide ($ZrO_2$) (see JP-A-2008-78407).

This JP-A-2008-78407 also discloses a configuration in which a second portion of the second vibration layer is removed, i.e., a configuration in which at arm portions of the vibration plate, the second vibration layer is removed with the first vibration layer unremoved. The removal of the second vibration layer at the arm portions of the vibration plate can improve the amount of displacement of the vibration plate while maintaining the strength of the vibration plate.

However, with the above-described configuration in which the insulating film is removed with the elastic film being unremoved at the arm portions of the vibration plate, for example, the following problems may be created.

When the insulating film is completely removed at the arm portions of the vibration plate, over-etching may occur and remove part of the elastic film as well, which decreases the reliability of the vibration plate. By contrast, when the insulating film is not completely removed and left with a predetermined thickness, the decrease in the reliability of the vibration plate can be prevented, but the amount of displacement of the vibration plate will not be sufficient, and the vibration efficiency may lower. In this way, there are various problems concerning the configuration around the arm portions of the vibration plate from the perspectives of, e.g., reliability and vibration efficiency.

Note that such problems are not limited to a liquid ejecting head typified by an ink jet recording head that ejects ink, and similarly occur in other piezoelectric devices as well.

SUMMARY

An aspect of the present disclosure to solve the above problem is a liquid ejecting head including: a piezoelectric element including a first electrode, a piezoelectric body layer, and a second electrode stacked in a first direction; a vibration plate vibrated by driving of the piezoelectric element; and a pressure chamber substrate that defines a pressure chamber where pressure is applied to a liquid by vibration of the vibration plate, in which the pressure chamber substrate, the vibration plate, and the piezoelectric element are stacked in this order in the first direction, the vibration plate includes a first layer containing silicon as a constituent element, a second layer disposed between the first layer and the piezoelectric body layer and containing a metal element other than zirconium as a constituent element, and a third layer disposed between the second layer and the piezoelectric body layer and containing zirconium as a constituent element, and when a region of the vibration plate that overlaps with the pressure chamber and overlaps with the first electrode, the piezoelectric body layer, and the second electrode when seen in the first direction is an active region, and when a region of the vibration plate that overlaps with the pressure chamber and does not overlap with the first electrode, the piezoelectric body layer, and the second electrode when seen in the first direction is an inactive region, the vibration plate has the first layer, the second layer, and the third layer in the active region, and has the first layer and the second layer and does not have the third layer in at least part of the inactive region.

Another aspect of the present disclosure is a liquid ejecting apparatus including the liquid ejecting head according to the above-described aspect.

Still another aspect of the present disclosure is a piezoelectric device including: a substrate having a concave portion; a piezoelectric element including a first electrode, a piezoelectric body layer, and a second electrode stacked in a first direction; and a vibration plate vibrated by driving of the piezoelectric element, in which the substrate, the vibration plate, and the piezoelectric element are stacked in this order in the first direction, the vibration plate includes a first layer containing silicon as a constituent element, a second layer disposed between the first layer and the piezoelectric body layer and containing a metal element other than zirconium as a constituent element, and a third layer disposed between the second layer and the piezoelectric body layer and containing zirconium as a constituent element, and when a region of the vibration plate that overlaps with the concave portion and overlaps with the first electrode, the piezoelectric body layer, and the second electrode when seen in the first direction is an active region, and when a region of the vibration plate that overlaps with the concave portion and does not overlap with the first electrode, the piezoelectric body layer, and the second electrode when seen in the first direction is an inactive region, the vibration plate has the first layer, the second layer, and the third layer in the active region and has the first layer and the second layer and does not have the third layer in at least part of the inactive region.

DESCRIPTION OF EXEMPLARY EMBODIMENTS

Figure 1:
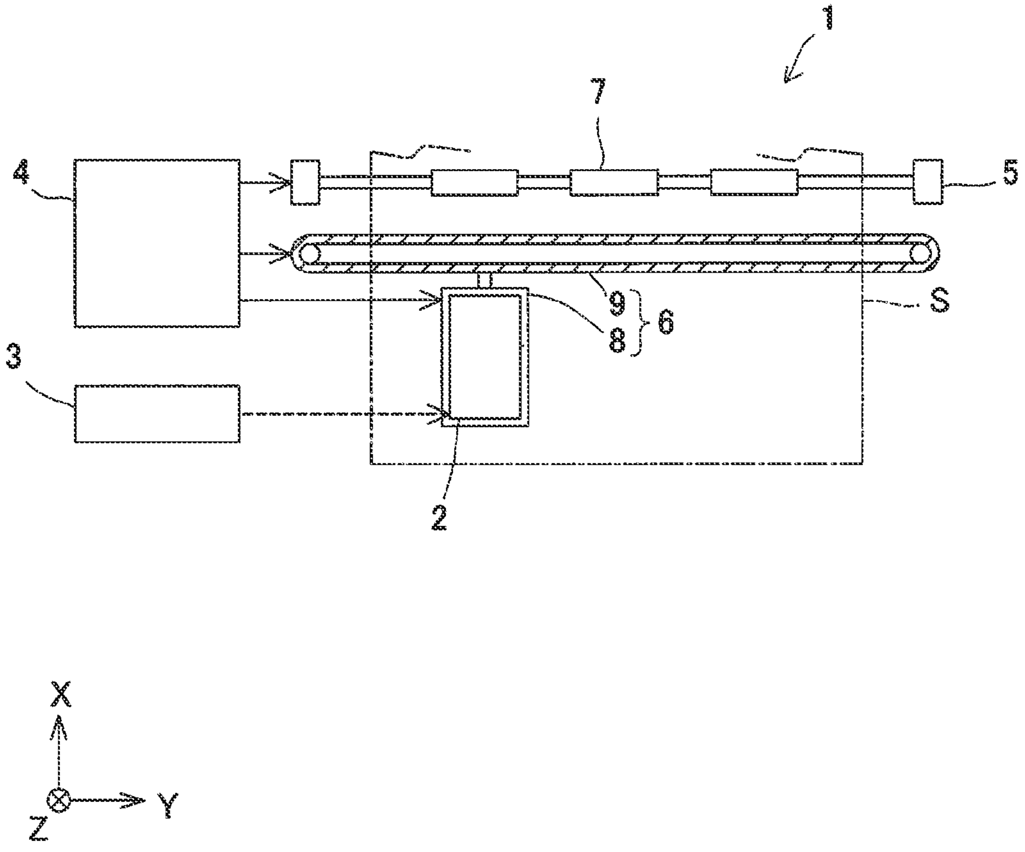
FIG. 1 is a schematic diagram of an ink jet recording apparatus according to Embodiment 1.

The present disclosure is described in detail below based on embodiments. However, the following description is about an aspect of the present disclosure, and configurations in the present disclosure can be changed within the scope of the present disclosure.

Also, throughout the drawings, X, Y, and Z represent three spatial axes orthogonal to one another. Herein, directions along these axes are the X-direction, the Y-direction, and the Z-direction. In the following description, the directions in which the arrows in the drawings point are positive (+) directions, and the directions opposite from the directions that the arrows point are negative (−) directions. Also, the Z-axis is a vertical direction, with the +Z-direction being vertically downward and the −Z-direction being vertically upward. Further, when no limitation needs to be made between positive and negative directions, three X, Y, and Z spatial axes are described as the X-axis, the Y-axis, and the Z-axis, respectively.

Embodiment 1

FIG. 1 is a diagram showing the schematic configuration of an ink jet recording apparatus 1 according to Embodiment 1 of the present disclosure.

First, the overall configuration of the ink jet recording apparatus 1 according to the present embodiment is described.

The ink jet recording apparatus (hereinafter referred to simply as "recording apparatus") 1 shown in FIG. 1 is an example of a liquid ejecting apparatus and is a printing apparatus that ejects ink, as a type of liquid, toward a medium S such as a print sheet so that ink droplets may land on the medium S and thereby prints an image or the like by arrangements of dots formed on the medium S. Note that besides the recording sheet, any material may be used as the medium S, such as a resin film or a cloth.

As shown in FIG. 1, the recording apparatus 1 includes an ink jet recording head (hereinafter also referred to simply as "recording head") 2, a liquid container 3, a control unit 4 as a controller, a transport mechanism 5 that feeds the medium S, and a moving mechanism 6.

Although details will be given later about the recording head 2, the recording head 2 ejects ink supplied from the liquid container 3 to the medium S from a plurality of nozzles.

The liquid container 3 separately retains a plurality of types (e.g., a plurality of colors) of ink to be ejected from the recording head 2. Examples of the liquid container 3 include a cartridge attachable to and detachable from the recording apparatus 1, a bag-shaped ink pack formed of a flexible film, and an ink tank replenishable with ink. Note that a plurality of types of ink different in, for example, color, component, or the like are retained in the liquid container 3.

The control unit 4 includes, for example, a control device such as a central processing unit (CPU) or a field-programmable gate array (FPGA) and a storage device such as semiconductor memory. The control device executes programs stored in the storage device, and thereby the control unit 4 performs overall control of the elements of the recording apparatus 1, namely the recording head 2, the transport mechanism 5, the moving mechanism 6, and the like.

The transport mechanism 5 transports the medium S in the X-axis direction and has transport rollers 7. Specifically, the transport mechanism 5 transports the medium S in the X-axis direction by rotating the transport rollers 7. Note that the transport mechanism 5 for transporting the mediums S is not limited to the one including the transport rollers 7, and may be one that transports the medium S using, for example, a belt or a drum.

The moving mechanism 6 is a mechanism for causing the recording head 2 to reciprocate in the Y-axis direction and includes a transport body 8 and a transport belt 9. The transport body 8 is a substantially box-shaped structure for housing the recording head 2, i.e., what is called a carriage, and is fixed to the transport belt 9. The transport belt 9 is an endless belt looped along the Y-axis. When the transport belt 9 rotates as controlled by the control unit 4, the recording head 2 reciprocates in the Y-axis direction along with the transport body 8. Note that the transport body 8 may be configured to be equipped with the liquid container 3 along with the recording head 2.

The recording head 2 executes, as controlled by the control unit 4, an ejection operation in which ink supplied from the liquid container 3 is ejected from a plurality of nozzles to the medium S in the +Z-direction as ink droplets. This ejection operation by the recording head 2 is performed in tandem with the transport of the medium S by the transport mechanism 5 and the reciprocation of the recording head 2 by the moving mechanism 6, so that an image is formed by the ink on the surface of the medium S, or in other words, printed.

Figure 2:
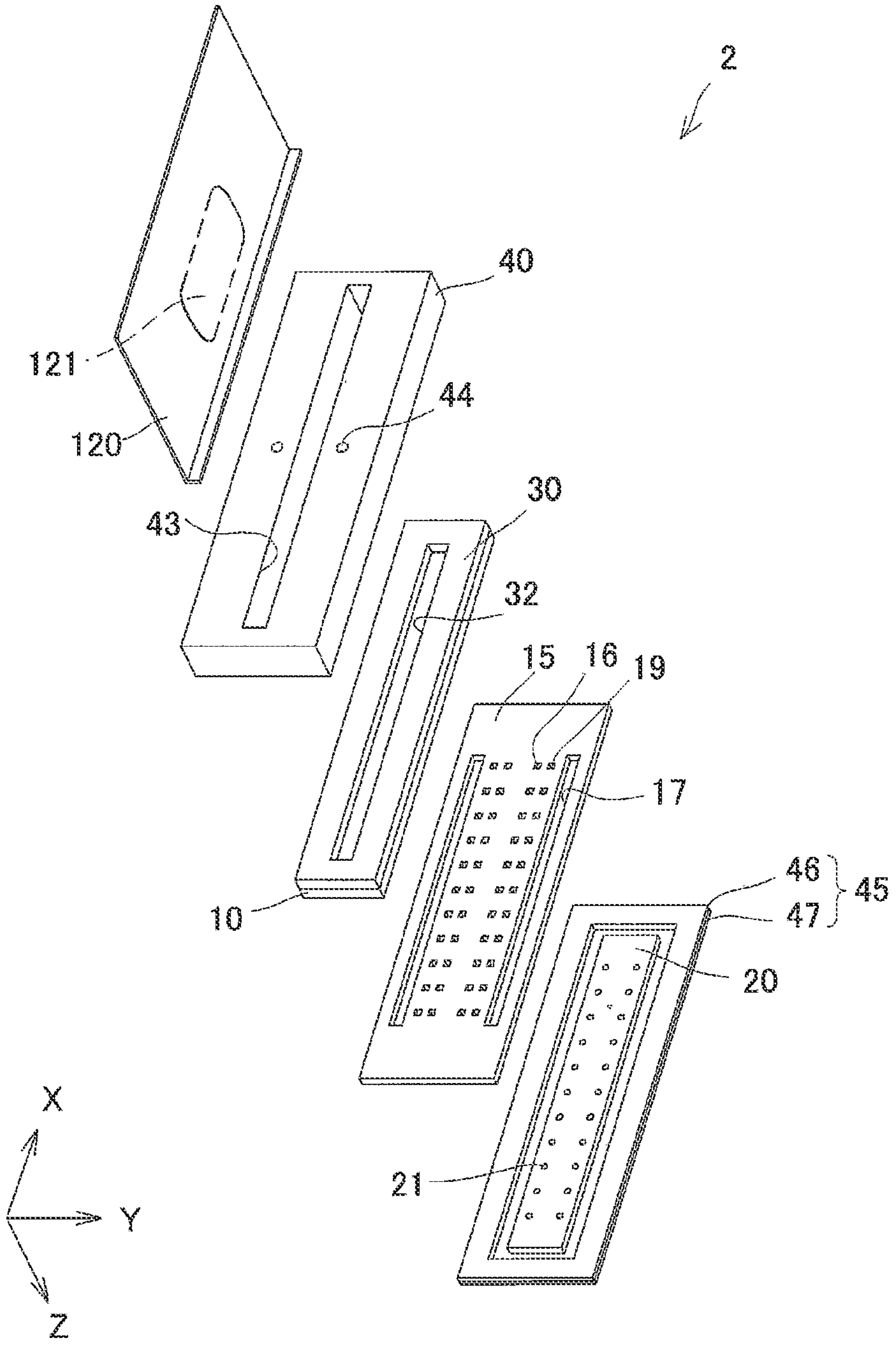
FIG. 2 is an exploded perspective view of a recording head according to Embodiment 1.
Figure 3:
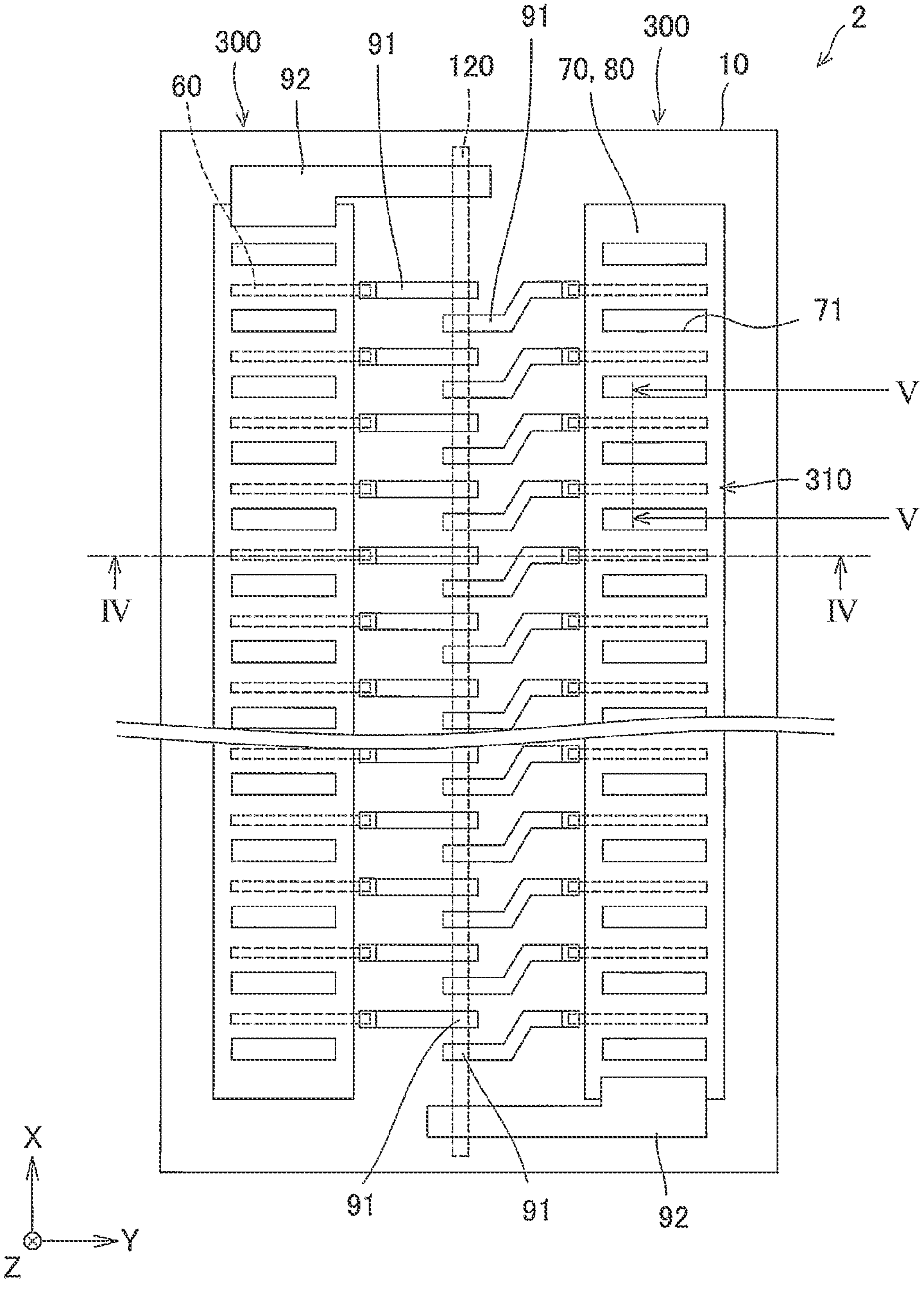
FIG. 3 is a plan view of the recording head according to Embodiment 1.
Figure 4:
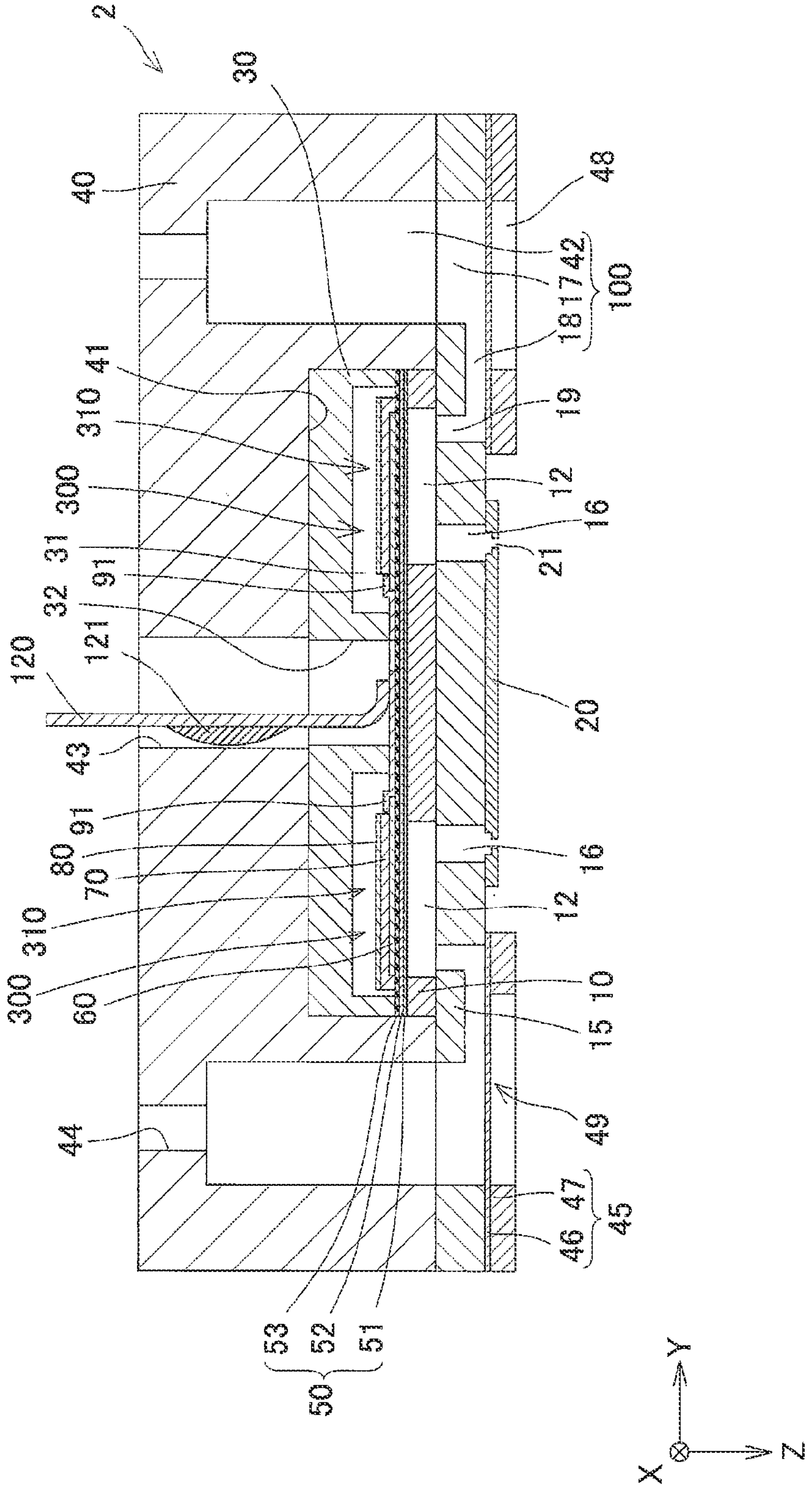
FIG. 4 is a sectional view of the recording head according to Embodiment 1.
Figure 5:
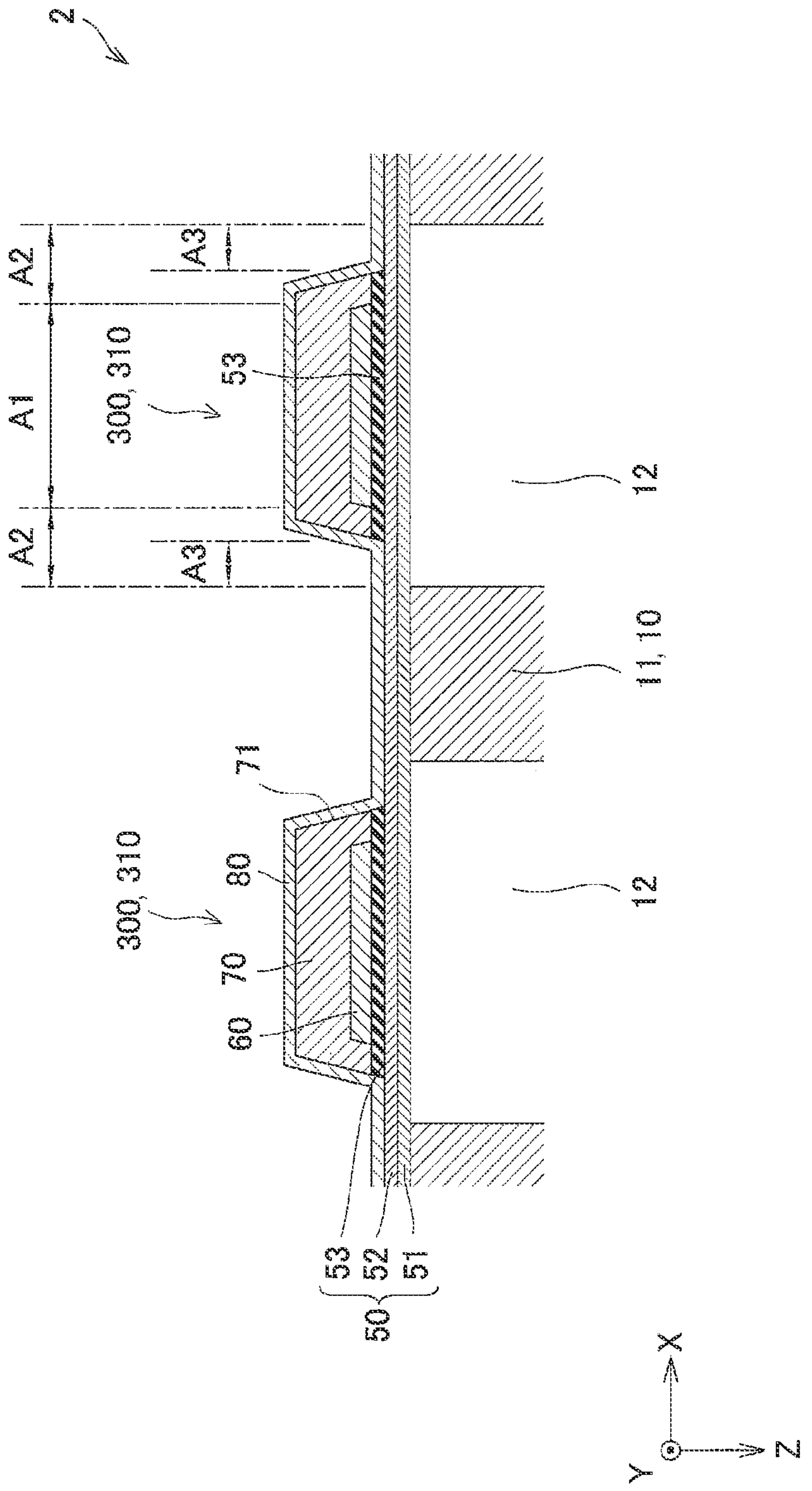
FIG. 5 is a sectional view of the recording head according to Embodiment 1.

FIG. 2 is an exploded perspective view of the recording head according to the present embodiment, and FIG. 3 is a plan view of the recording head and is a diagram illustrating the schematic configuration of piezoelectric elements. FIG. 4 is a sectional view of the recording head and is a diagram corresponding to the line IV-IV in FIG. 3. FIG. 5 is a sectional view illustrating the configurations of a vibration plate and piezoelectric elements and is a diagram corresponding to the line V-V in FIG. 3.

As shown in the drawings, the recording head 2 according to the present embodiment includes a pressure chamber substrate 10. The pressure chamber substrate 10 is formed of, for example, a silicon substrate, a glass substrate, a silicon-on-insulator (SOI) substrate, a substrate of any type of ceramics, or the like.

The pressure chamber substrate 10 has pressure chambers 12, as concave portions, arranged side by side in the X-axis direction. The plurality of pressure chambers 12 are disposed on a straight line extending in the X-axis direction so as to be located at the same position in the Y-axis direction. The pressure chambers 12 adjacent to each other in the X-axis direction are defined by partition walls 11. It goes without saying that the arrangement of the pressure chambers 12 is not limited to a particular arrangement. For example, the plurality pressure chambers 12 arranged in the X-axis direction may be alternately shifted in position in the Y-axis direction, i.e., may be arranged in a zigzag manner.

Also, the pressure chambers 12 of the present embodiment are each formed in, for example, a rectangular shape which is longer in the Y-axis direction than in the X-axis direction in a plan view seen from the +Z-direction. It goes without saying that the shape of the pressure chamber 12 in a plan view seen from the +Z-direction is not limited to a particular shape, and may be a parallelogram shape, a polygonal shape, a circular shape, an oval shape, or the like. The oval shape herein refers to a shape which is a rectangle-based shape whose end portions in the longer-side direction are semicircular, and includes a rounded rectangle shape, an elliptic shape, an egg shape, and the like.

On the +Z-direction side of the pressure chamber substrate 10, a communication plate 15 and a set of a nozzle plate 20 and a compliance substrate 45 are sequentially stacked.

The communication plate 15 is provided with nozzle communication channels 16 through which the pressure chambers 12 and nozzles 21 communicate with each other. The communication plate 15 is also provided with a first manifold portion 17 and a second manifold portion 18 forming part of a manifold 100 which is a shared liquid chamber through which the plurality of pressure chambers 12 communicate. The first manifold portion 17 is provided penetrating through the communication plate 15 in the Z-axis direction, and the second manifold portion 18 is provided not penetrating through the communication plate 15 in the Z-axis direction but opening at a surface on the +Z-direction side.

The communication plate 15 is further provided with supply communication channels 19 independently for the respective pressure chambers 12, each supply communication channel 19 communicating with one of Y-axis-direction end portions of the corresponding pressure chamber 12. The supply communication channels 19 allow the second manifold portion 18 to communicate with the pressure chambers 12 and supply ink in the manifold 100 to the respective pressure chambers 12.

As the communication plate 15, a silicon substrate, a glass substrate, an SOI substrate, a substrate of any type of ceramics, a metal substrate, or the like can be used.

The nozzle plate 20 is provided on a surface of the communication plate 15 that is opposite from the pressure chamber substrate 10, i.e., a surface on the +Z-direction side. The nozzle plate 20 has the nozzles 21 formed therein, the nozzles 21 communicating with the respective pressure chambers 12 via the nozzle communication channels 16.

In the present embodiment, the plurality of nozzles 21 are provided in correspondence with the respective pressure chambers 12 and are arranged to form a line in the X-axis direction. Then, the nozzle plate 20 is provided with two nozzle rows of such plurality of nozzles 21, the rows being arranged in the Y-axis direction. Thus, the plurality of nozzles 21 in each row are disposed to be located at the same position in the Y-axis direction. Note that the arrangement of the nozzles 21 is not limited to a particular one. For example, the nozzles 21 arranged side by side in the X-axis direction may be alternately shifted in position in the Y-axis direction.

A material of the nozzle plate 20 is not limited to a particular one, and for example, a silicon substrate, a glass substrate, an SOI substrate, a substrate of any type of ceramics, a metal substrate, or the like can be used. Examples of the metal plate include a stainless steel substrate. Further, an organic material such as a polyimide resin or the like can also be used as a material of the nozzle plate 20.

The compliance substrate 45 is, together with the nozzle plate 20, provided at the surface of the communication plate 15 opposite from the pressure chamber substrate 10, i.e., the surface on the +Z-direction side. This compliance substrate 45 is provided around the nozzle plate 20, sealing the openings of the first manifold portion 17 and the second manifold portion 18 provided in the communication plate 15. In the present embodiment, the compliance substrate 45 includes a sealing film 46 formed of a thin flexible film and a fixing substrate 47 formed of a hard material such as metal. A region of the fixing substrate 47 that faces the manifold 100 is an opening portion 48 where the fixing substrate 47 is completely removed in the thickness direction. Thus, one of the surfaces of the manifold 100 is a compliance portion 49 sealed only with the flexible sealing film 46.

Meanwhile, although details will be described later, a vibration plate 50 and piezoelectric elements 300 that bend and deform the vibration plate 50 and thereby cause a pressure change to the ink in the pressure chambers 12 are provided at the surface of the pressure chamber substrate 10 opposite from the nozzle plate 20 and the like, i.e., the surface on the −Z-direction side surface.

A protection substrate 30 having substantially the same size as the pressure chamber substrate 10 is also joined to the −Z-direction side surface of the pressure chamber substrate 10. The protection substrate 30 has holding portions 31 which are spaces for protecting the piezoelectric elements 300. The holding portions 31 are provided independently for the respective rows of the piezoelectric elements 300 arranged side by side in the X-axis direction, and thus, two of them are formed side by side in the Y-axis direction. Also, the protection substrate 30 is provided with a through-hole 32 penetrating in the Z-axis direction between the two holding portions 31 arranged side by side in the Y-axis direction.

Also, a case member 40 is fixed onto the protection substrate 30 and defines, together with the communication plate 15, the manifold 100 communicating with the plurality of pressure chambers 12. The case member 40 has substantially the same shape as the above-described communication plate 15 in a plan view, and is joined not only to the protection substrate 30, but also to the above-described communication plate 15.

This case member 40 has a housing portion 41 on the protection substrate 30 side, the housing portion 41 being a space deep enough to house the pressure chamber substrate 10 and the protection substrate 30. This housing portion 41 has a larger opening area than the surface of the protection substrate 30 that is joined to the pressure chamber substrate 10. Then, with the pressure chamber substrate 10 and the protection substrate 30 housed in the housing portion 41, the opening surface of the housing portion 41 on the nozzle plate 20 side is sealed by the communication plate 15.

Also, the case member 40 has a third manifold portion 42 defined at each of the outer sides of the housing portion 41 in the Y-axis direction. The manifold 100 is formed by the first manifold portion 17 and the second manifold portion 18 provided in the communication plate 15 and the third manifold portion 42. The manifold 100 is provided continuously in the X-axis direction, and the supply communication channels 19 that cause the respective pressure chambers 12 to communicate with the manifold 100 are arranged side by side in the X-axis direction.

The case member 40 is also provided with inlets 44 that communicate with the corresponding manifolds 100 to supply ink to the respective manifolds 100. The case member 40 is further provided with a connection port 43 which communicates with the through-hole 32 of the protection substrate 30 and through which a wiring substrate 120 is inserted.

In such a recording head 2 of the present embodiment, ink is taken in from the inlets 44 coupled to external ink supply means (not shown), the inside is filled with the ink from the manifolds 100 to the nozzles 21, and then, voltage is applied to the piezoelectric elements 300 corresponding to the pressure chambers 12 according to recording signals from a driving circuit 121. As a result, the vibration plate 50 bends and deforms along with the piezoelectric elements 300 to increase the pressure in each of the pressure chambers 12, and ink droplets are ejected from the respective nozzles 21.

The configuration of the vibration plate 50 and the piezoelectric elements 300 according to the present embodiment is described below. As described earlier, the vibration plate 50 and the piezoelectric elements 300 are provided on the −Z-direction-side surface of the pressure chamber substrate 10. Thus, the pressure chamber substrate the vibration plate 50, and the piezoelectric elements 300 are stacked in this order in the Z-axis direction which is a first direction.

The piezoelectric element 300 is pressure generation means that causes a pressure change to the ink inside the pressure chamber 12 and is also called a piezoelectric actuator. This piezoelectric element 300 includes a first electrode 60, a piezoelectric body layer and a second electrode 80 stacked sequentially from the +Z-direction side, which is the vibration plate 50 side, to the −Z-direction side.

A portion of the piezoelectric element 300 where piezoelectric distortion is caused in the piezoelectric body layer 70 when a voltage is applied between the first electrode 60 and the second electrode 80 is referred to as an activation portion 310. On the other hand, a portion of the piezoelectric element 300 where no piezoelectric distortion is caused in the piezoelectric body layer 70 is referred to as a non-activation portion. In other words, the activation portion 310 is a portion of the piezoelectric element 300 where the piezoelectric body layer 70 is sandwiched by the first electrode 60 and the second electrode 80, and the inactivation portion is a portion of the piezoelectric element 300 where the piezoelectric body layer 70 is not sandwiched by the first electrode 60 and the second electrode 80.

Typically, one of the first electrode 60 and the second electrode 80 forms individual electrodes independently for the activation portions 310, and the other one of the electrodes forms a shared electrode shared by a plurality of activation portions 310. In the present embodiment, the first electrode 60 forms the individual electrodes, and the second electrode 80 forms the shared electrode.

Specifically, the first electrode 60 is cut into pieces for the respective pressure chambers 12, each piece forming an individual electrode independently for the corresponding activation portion 310. The first electrode 60 is formed with a narrower width than the pressure chamber 12 in the X-axis direction. In other words, in the X-axis direction, end portions of the first electrode 60 are located inside of a region facing the pressure chamber 12.

Also, in the Y-axis direction, one end portion of the first electrode 60 is disposed outside a region facing the pressure chamber 12. Meanwhile, the other end portion of the first electrode 60 is disposed inside the region facing the pressure chamber 12.

Although there is no particular limitation as to a material of the first electrode 60, a conductive material can be used, such as, for example, iridium (Ir), platinum (Pt), palladium (Pd), gold (Au), nickel (Ni), chrome (Cr), nickel chrome (NiCr), tungsten (W), titanium (Ti), titanium oxide ($TiO_2$), or titanium tungsten (TiW).

The piezoelectric body layer 70 is provided continuously in the X-axis direction with its length in the Y-axis direction being a predetermined length. In other words, the piezoelectric body layer 70 is provided continuously with a predetermined thickness, extending in the direction in which the pressure chambers 12 are provided side by side. Although the thickness of the piezoelectric body layer 70 is not limited to a particular thickness, the piezoelectric body layer 70 is formed with a thickness of approximately 1 to 4 μm. Also, the length of the piezoelectric body layer 70 in the Y-axis direction is longer than the length of the pressure chamber 12 measured in the Y-axis direction, which is the longer-side direction of the pressure chamber 12, and the piezoelectric body layer 70 extends beyond and outward of both sides of the pressure chamber 12 in the Y-axis direction.

In the present embodiment, an end portion of the piezoelectric body layer 70 at the side opposite from the nozzle 21 is located outward of an end portion of the first electrode 60. In other words, the end portion of the first electrode 60 at the side opposite from the nozzle 21 is covered by the piezoelectric body layer 70. Also, an end portion of the piezoelectric body layer 70 on the nozzle 21 side is located inward of an end portion of the first electrode 60, and therefore the end portion of the first electrode 60 on the nozzle 21 side is exposed, not covered by the piezoelectric body layer 70.

Also, groove portions 71 are formed in the piezoelectric body layer 70, at positions corresponding to the partition walls 11. The groove portions 71 are provided penetrating through the piezoelectric body layer 70 in the Z-axis direction, which is the thickness direction. However, the groove portions 71 may be provided not penetrating through the piezoelectric body layer 70 in the Z-axis direction but extending midway through the piezoelectric body layer 70 in the thickness direction. In other words, the piezoelectric body layer 70 may partially remain on the bottom surfaces of the groove portions 71.

Also, in the X-axis direction, the groove portion 71 is as wide as or wider than the partition wall 11. In the present embodiment, the groove portion 71 is wider than the partition wall 11 in the X-axis direction. Thus, end portions of the piezoelectric body layer 70 in the X-axis direction that are defined by the groove portions 71 are located inside the pressure chamber 12. This reduces the rigidity of portions of the vibration plate 50 that face both end portions of the pressure chamber 12 in the X-axis direction, i.e., arm portions of the vibration plate 50, and thus makes it easier for the piezoelectric element 300 to be displaced.

Note that the end portions of the first electrode 60 in the X-axis direction are covered by the piezoelectric body layer 70. In other words, the end portions of the piezoelectric body layer 70 in the X-axis direction that are defined by the groove portions 71 are located inside the pressure chamber 12 and outward of the end portions of the first electrode 60.

This piezoelectric body layer 70 is formed using a piezoelectric material formed of a composite oxide with a perovskite structure that has the general formula $ABO_3$. In the present embodiment, lead zirconate titanate (PZT; $Pb(Zr,Ti)O_3$) is used as the piezoelectric material. When PZT is used as the piezoelectric material, the piezoelectric body layer 70 having a relatively large piezoelectric constant d31 is obtained.

In a composite oxide with a perovskite structure that has the general formula $ABO_3$, an octahedron is formed by the A-site having a 12-fold oxygen coordination and the B-site having a 6-fold oxygen coordination. In the present embodiment, lead (Pb) is located at the A-site, and zirconium (Zr) and titanium (Ti) are located at the B-site.

The piezoelectric material is not limited to PZT described above. The A-site or B-site may include other elements. For example, the piezoelectric material may be a perovskite material such as barium zirconate titanate ($Ba(Zr,Ti)O_3$), lead lanthanum zirconate titanate ($(Pb,La)(Zr,Ti)O_3$), lead zirconate titanate magnesium niobate ($Pb(Zr,Ti)(Mg,Nb)O_3$), or lead zirconate titanate niobate ($Pb(Zr,Ti,Nb)O_3$) containing silicon.

Alternatively, the piezoelectric material may be a material with a reduced content of Pb, i.e., a low-lead material, or a material containing no Pb, i.e., a lead-free material. Using a less amount of Pb can be accomplished when a low-lead material is used as the piezoelectric material. Using no Pb can be accomplished when a lead-free material is used as the piezoelectric material. Thus, using a low-lead or lead-free material as the piezoelectric material helps reduce environmental burden. Examples of a lead-free piezoelectric material include a BFO-based material containing bismuth ferrate (BFO; $BiFeO_3$) or a KNN-based material containing potassium sodium niobate (KNN; $KNaNbO_3$).

The second electrode 80 is provided continuously on the −Z-direction side of the piezoelectric body layer 70 which is the opposite side from the first electrode 60 and forms a shared electrode shared by the plurality of activation portions 310. The second electrode 80 is provided continuously in the X-axis direction with its length in the Y-axis direction being a predetermined length. The second electrode 80 is provided also on the inner surfaces of the groove portions 71, i.e., on the side surfaces of the groove portions 71 of the piezoelectric body layer 70 and on the vibration plate 50 which is the bottom surfaces of the groove portions 71. It goes without saying that the second electrode 80 may be provided only on part of the inner surface of each groove portion 71, not over the entire inner surface of the groove portion 71.

Although a material of the second electrode 80 is not limited to a particular material, a precious metal such as iridium (Ir), platinum (Pt), palladium (Pd), or gold (Au), a conductive oxide typified by lanthanum nickel oxide (LNO), or the like is used. Also, the second electrode 80 may be a stack of a plurality of materials, and in such a case, a material containing iridium (Ir) and titanium (Ti) is preferably used as a material of the second electrode 80.

Also, individual lead electrodes 91 which are lead wires are drawn from the first electrodes 60, and shared lead electrodes 92 which are lead wires are drawn from the second electrodes 80. The flexible wiring substrate 120 is coupled to the individual lead electrodes 91 and the shared lead electrodes 92, at their end portions opposite from the piezoelectric element 300. In the present embodiment, the individual lead electrodes 91 and the shared lead electrode 92 extend in such a manner as to be exposed through the through-hole 32 formed in the protection substrate 30 and are electrically coupled to the wiring substrate 120 in this through-hole 32. On this wiring substrate 120, the driving circuit 121 having switching elements for driving the piezoelectric elements 300 are implemented.

As shown in FIG. 5 and the like, the vibration plate 50 includes a first layer 51, a second layer 52, and a third layer 53, and these are stacked in this order in the −Z-direction. Specifically, the first layer 51 is a layer disposed closest to the +Z-direction side among the layers of the vibration plate 50 and is in contact with the pressure chamber substrate 10, the third layer 53 is a layer disposed closest to the −Z-direction side among the layers of the vibration plate 50 and is in contact with the piezoelectric element 300, and the second layer 52 is a layer disposed between the first layer 51 and the third layer 53.

Note that although the interfaces between the layers forming the vibration plate 50 are clearly depicted in FIG. 5 and the like, the interfaces do not have to be clear. For example, materials forming two layers adjacent to each other may be mixed near the interface between the two layers.

The first layer 51 is provided over the entire surface of the pressure chamber substrate 10 and contains silicon (Si) as a constituent element. Specifically, the first layer 51 is an elastic film formed of, for example, silicon oxide ($SiO_2$). Although the method for forming the first layer 51 is not limited to a particular method, the first layer 51 is formed by, for example, thermal oxidation of the surface of the pressure chamber substrate 10. Other than being present in the state of an oxide, silicon in the first layer 51 may be present in the state of silicon as a single element, a nitride thereof, an oxynitride thereof, or the like.

Although details will be given later, the third layer 53 is provided not on the entire surface of the pressure chamber substrate 10, but on predetermined regions, and contains zirconium (Zr) as a constituent element. Specifically, the third layer 53 is, for example, an insulating film formed of zirconium oxide ($ZrO_2$). Although the method for forming the third layer 53 is not limited to a particular method, the third layer 53 is formed by, for example, forming a layer of zirconium as a single element by sputtering or the like and thermally oxidizing the layer. Other than being present in the state of an oxide, zirconium in the third layer 53 may be present in the state of zirconium as a single element, a nitride thereof, an oxynitride thereof, or the like.

Zirconium oxide has excellent electrical insulation, mechanical strength, and toughness. For this reason, the properties of the vibration plate 50 can be enhanced when the third layer 53 contains zirconium oxide. Also, for example, when the piezoelectric body layer 70 is formed by lead zirconate titanate, the third layer 53 containing zirconium oxide offers an advantage that in the formation of the piezoelectric body layer 70, it is easier to obtain the piezoelectric body layer 70 preferentially oriented on the (100) plane with a high rate of orientation.

The second layer 52 is a layer containing an element other than zirconium as a constituent element and provided between the first layer 51 and the third layer 53, and is provided over the entire surface of the pressure chamber substrate 10. This second layer 52 prevents a contact between the first layer 51 and the third layer 53 and thus makes is less likely for the silicon oxide in the first layer 51 to be reduced by the zirconium in the third layer 53.

The second layer 52 is preferably a layer containing a metal element which is more resistant to oxidation than zirconium, which is a constituent element of the third layer 53, and is more preferably formed by an oxide of the metal element. In other words, the second layer 52 preferably contains a metal element having higher free energy of formation of oxide than zirconium. Note that their magnitudes of the free energy of formation of oxide may be evaluated based on, for example, a publicly-known Ellingham diagram.

Specifically, the second layer 52 is preferably formed containing, for example, a metal element which is any one of titanium (Ti), aluminum (Al), chrome (Cr), and tantalum (Ta) as a constituent element. Note that the second layer 52 may contain one metal element or two or more metal elements.

When the second layer 52 contains a metal element which is more resistant to oxidation than zirconium, the silicon oxide contained in the first layer 51 is less likely to be reduced than in a case where the second layer 52 contains a metal element which is more susceptible to oxidation than zirconium, i.e., than with a configuration in which the metal element contained in the second layer 52 has lower free energy of formation of oxide than zirconium. As a result, the adhesion strength between the first layer 51 and the third layer 53 can be higher than in a configuration without the second layer 52.

Also, the provision of the second layer 52 reduces formation of a gap at the interface of the third layer 53. In other words, moisture intrusion into the interface between the third layer 53 and the second layer 52 can be reduced. Thus, embrittlement of zirconium in the third layer 53 due to moisture can be reduced, which makes it possible to reduce breakage of the third layer 53, such as peeling or cracking.

Also, a material of the second layer 52 preferably has a higher Young's modulus than a material of the first layer 51. As described above, the second layer 52 preferably contains, for example, a metal element which is any one of titanium (Ti), aluminum (Al), chrome (Cr), and tantalum (Ta) as a constituent element. This helps prevent over-etching from occurring when the third layer 53 is etched, as will be described later.

Further, a material of the second layer 52 preferably has a higher Young's modulus than a material of the third layer 53. For example, titanium (Ti) and aluminum (Al) have higher Young's moduli than zirconium (Zr), which is a material of the third layer 53. Thus, when they are used as a material of the second layer 52, the second layer 52 can function as an etching stop layer even if the second layer 52 is relatively thin. Also, making the second layer 52 thin can improve displacement of the vibration plate 50. Further, using the second layer 52 reduces atomic diffusion. This, as a result, can reduce generation of leak current.

Meanwhile, for example, chrome (Cr) and tantalum (Ta) have lower Young's moduli than zirconium (Zr), which is a material of the third layer 53. Thus, using them as a material of the second layer 52 helps improve the amount of displacement of the vibration plate 50. Also, even when these materials are used, the second layer 52 can still function as an etching stop layer by having a larger thickness.

In the recording head 2 according to the present disclosure, the third layer 53 forming the vibration plate 50 is provided not over the entire surface of the vibration plate 50 but on predetermined regions.

Specifically, as shown in FIG. 5, the third layer 53 is provided at regions corresponding to the pressure chambers 12, arranged in the X-axis direction, which is a direction orthogonal to the direction in which the individual lead electrode 91 are drawn. In the present embodiment, the third layer 53 is formed with substantially the same width as the piezoelectric body layer 70. In other words, the end portions of the third layer 53 in the X-axis direction are located inside of the pressure chamber 12 and outward of the end portions of the first electrode 60. Thus, at portions facing the end portions of the pressure chamber 12 in the X-axis direction, i.e., the arm portions of the vibration plate 50, there are portions where the third layer 53 is not formed. This can improve the amount by which the vibration plate 50 is displaced when the piezoelectric elements 300 are driven. Note that the positions of the end portions of the third layer 53 in the Y-axis direction are, in the present embodiment, located outside of the pressure chambers 12.

In this way, in the X-axis direction, the third layer 53 is provided separately at regions corresponding to the pressure chambers 12. In other words, the vibration plate 50 is configured as follows. For example, in FIG. 5, a region of the vibration plate 50 that overlaps with the pressure chamber 12 and overlaps with the first electrode 60, the piezoelectric body layer 70, and the second electrode 80 when seen in the Z-axis direction, which is the first direction, is referred to as an active region A1. In other words, in a portion of the vibration plate 50 that faces the pressure chamber 12, a region overlapping with the activation portion 310 of the piezoelectric element 300 is referred to as the active region A1.

Also, a region of the vibration plate 50 that overlaps with the pressure chamber 12 and does not overlap with the first electrode 60, the piezoelectric body layer 70, and the second electrode 80 when seen in the Z-axis direction is referred to as an inactive region A2. In other words, in a portion of the vibration plate 50 that faces the pressure chamber 12, a region not overlapping with the activation portion 310 of the piezoelectric element 300 is referred to as the inactive region A2. In the present embodiment, the inactive region A2 is a region overlapping with the pressure chamber 12 and not overlapping with the first electrode 60 when seen in the Z-axis direction. In other words, in a portion of the vibration plate 50 that faces the pressure chamber 12, a region different from the active region A1 is the inactive region A2. This inactive region A2 includes a region which is what is called the arm portion of the vibration plate 50, and in the present embodiment, the active region A1 is located between two inactive regions A2 when seen in a cross section in the Z-axis direction.

Also, in the present embodiment, the pressure chamber substrate 10, the vibration plate 50, the first electrode 60, the piezoelectric body layer 70, and the second electrode 80 are stacked in this order in the Z-axis direction, and the second electrode 80, which is a shared electrode, is provided continuously from the active region A1 to the inactive region A2.

Then in the X-axis direction, the vibration plate 50 in the active region A1 has the first layer 51, the second layer 52, and the third layer 53. Meanwhile, in the X-axis direction, the vibration plate 50 in part of the inactive region A2 has the first layer 51 and the second layer 52 but does not have the third layer 53. In other words, the first layer 51 and the second layer 52 forming the vibration plate 50 are formed over the entire region continuously between the active region A1 and the inactive region A2, but the third layer 53 is removed in part of the inactive region A2. In the present embodiment, the third layer 53 is removed in a partial region of each inactive region A2, the partial region being on the partition wall 11 side. Such a region of the vibration plate 50 that overlaps with the pressure chamber 12 and does not overlap with the third layer 53 when seen in the Z-axis direction, which is the first direction, is referred to as a removed region A3. Note that the removed region A3 is part of the inactive region A2. The vibration plate 50 in this removed region A3 is formed by the first layer 51 and the second layer 52. Note that in the present embodiment, the positions of the end portions of the third layer 53 in the X-axis direction, i.e., the borders of the removed region A3, are located on the extensions of the end surfaces of the piezoelectric body layer 70 defined by the groove portions 71.

Also, in the present embodiment, in the X-axis direction, the third layer 53 is removed not only in the inactive region A2, but also in regions outside the pressure chambers 12. In other words, the vibration plate 50 is formed by the first layer 51 and the second layer 52 also in regions outside the pressure chambers 12 in the X-axis direction. However, the third layer 53 does not necessarily have to be removed in regions outside the pressure chambers 12.

As thus described, the recording head 2 according to the present embodiment has the piezoelectric elements 300 each including the first electrode 60, the piezoelectric body layer 70, and the second electrode 80 that are stacked in the Z-axis direction, which is the first direction, the vibration plate 50 vibrated by driving of the piezoelectric elements 300, and the pressure chamber substrate 10 that defines the pressure chambers 12 where pressure is applied to ink, which is a liquid, by the vibration of the vibration plate 50. The pressure chamber substrate 10, the vibration plate 50, and the piezoelectric element 300 are stacked in this order in the Z-axis direction, the vibration plate 50 includes the first layer 51 containing silicon as a constituent element, the second layer 52 disposed between the first layer 51 and the first electrode 60 and containing a metal element other than zirconium as a constituent element, and the third layer 53 disposed between the second layer 52 and the first electrode 60 and containing zirconium as a constituent element. When a region of the vibration plate 50 that overlaps with the pressure chamber 12 and overlaps with the first electrode 60, the piezoelectric body layer 70, and the second electrode 80 when seen in the Z-axis direction is the active region A1 and a region of the vibration plate 50 that overlaps with the pressure chamber 12 and does not overlap with the first electrode 60, the piezoelectric body layer 70, and the second electrode 80 when seen in the Z-axis direction is the inactive region A2, the vibration plate 50 has the first layer 51, the second layer 52, and the third layer 53 in the active region A1 and has the first layer 51 and the second layer 52 and does not have the third layer 53 in at least part of the inactive region A2.

With such a configuration, the amount by which the vibration plate 50 is displaced when the piezoelectric elements 300 are driven can be improved, and at the same time, occurrence of cracking of the vibration plate 50 can be reduced. Also, because the vibration plate 50 has the second layer 52 in the active region A1 and the inactive region A2, when the third layer 53 is removed by, for example, dry etching in part of the inactive region A2, i.e., an arm portion of the vibration plate, the first layer 51 containing silicon as a constituent element is not removed due to over-etching. Thus, a decrease in reliability of the vibration plate 50 can be prevented.

Because the third layer 53 containing zirconium as a constituent element is removed in at least part of the inactive region A2 of the vibration plate 50, which is the removed region A3 in the present embodiment, an end portion of the third layer 53 is in the inactive region A2. For this reason, there is a possibility of moisture intrusion from the end portion of the third layer 53 into the interface between the end portion of the third layer 53 and its underlayer, which may break the third layer 53 due to peeling, cracking, or the like.

However, the adhesiveness of the third layer 53 improves in the present disclosure because the vibration plate 50 includes the second layer 52 containing a metal element other than zirconium as a constituent element, i.e., is provided with the second layer 52 as an underlayer for the third layer 53. This helps prevent moisture intrusion from the end portion of the third layer 53 located in the inactive region A2 to the interface between the third layer 53 and the second layer 52. Consequently, embrittlement of zirconium in the third layer 53 due to moisture can be reduced, which can reduce breakage of the third layer 53 due to peeling, cracking, or the like.

Also, at the removed region A3 in the inactive region A2 where the third layer 53 of the vibration plate 50 is removed, the vibration plate 50 is thin and susceptible to stress concentration. Thus, cracking or peeling may occur in portions of the second electrode 80 that are provided in the removed regions A3.

However, in the present disclosure, in the removed regions A3 of the vibration plate 50, the second electrode is directly stacked on the second layer 52, and the second electrode 80 and the second layer 52 are formed of materials with a high affinity for each other. For example, when a metal material such as titanium (Ti) or iridium (Ir) is used as a material of the second electrode 80, an oxide or nitride of the metal material is used as a material of the second layer 52. In other words, the second electrode contains a metal element as a single element, and the second layer 52 contains an oxide or nitride of the metal element.

This improves the adhesiveness between the second layer 52 of the vibration plate 50 and the second electrode forming the piezoelectric element 300, reducing breakage of the vibration plate 50 or the second electrode 80 at the arm portion.

Also, it is preferable that the second layer 52 be formed continuously between the active region A1 and the inactive region A2 of the vibration plate 50. In other words, the second layer 52 is preferably formed over the entire region in the active region A1 and the inactive region A2. This makes it easier to reduce occurrence of cracking of the vibration plate 50.

Note that the second layer 52 does not necessarily have to be formed continuously between the active region A1 and the inactive region A2 of the vibration plate 50. For example, in a center portion of the region where the third layer 53 of the vibration plate 50 is formed, there may be a region where the second layer 52 is not formed.

Also, a material of the second layer 52 preferably has a higher Young's modulus than a material of the first layer 51. This makes it easier to prevent over-etching in etching of the third layer 53 of the vibration plate 50.

The second layer 52 preferably contains, as a constituent element, a metal element which is more resistant to oxidation than zirconium, which is a constituent element of the third layer 53. The second layer 52 preferably contains, as a constituent element, a metal element which is any one of titanium, aluminum, chrome, and tantalum.

In the relation between the first layer 51 and the third layer 53, zirconium (Zr) contained in the third layer is relatively susceptible to oxidation, and silicon oxide ($SIO_2$) contained in the first layer 51 is susceptible to reduction. Thus, when the third layer 53 and the first layer 51 are stacked directly, the silicon oxide in the first layer is reduced. When silicon as a single element generated by this reduction is diffused from the first layer 51 to the third layer 53, a void may be generated at the interface of the third layer 53.

However, because the second layer 52 is provided between the first layer 51 and the third layer 53 and contains a metal element which is more resistant to oxidation than zirconium, which is a constituent element of the third layer 53, the generation of the void attributable to the diffusion can be reduced. The adhesiveness of the third layer 53 can thus be improved, which helps prevent breakage of the third layer 53 such as peeling and cracking.

Also, it is preferable that in at least part of the inactive region A2, the second layer 52 of the vibration plate 50 is stacked adjacent to one of the first electrode and the second electrode 80. For example, in the present embodiment, the second layer 52 of the vibration plate 50 is stacked adjacent to the second electrode 80 in at least part of the inactive region A2, i.e., in the removed region A3.

Also, the second electrode 80 stacked adjacent to the second layer 52 of the vibration plate 50 preferably contains, as a constituent element, a metal element contained in the second layer 52. Further, it is preferable that the second electrode 80 stacked adjacent to the second layer 52 of the vibration plate 50 contain the metal element as a single element and that the second layer 52 contain an oxide or nitride of the metal element.

This enables improvement in the adhesiveness between the second layer 52 of the vibration plate 50 and the second electrode 80 forming the piezoelectric element 300 and reduction of breakage of the vibration plate 50 and the second electrode 80 at the arm portions.

In the inactive region A2, the removed region A3 which overlaps with the pressure chamber 12 when seen in the Z-axis direction as the first direction and does not have the third layer 53 preferably does not overlap with the piezoelectric body layer 70 when seen in the first direction. This is because such a configuration makes it easier for the crystallinity of the piezoelectric body layer 70 to be homogeneous than in a case where the piezoelectric body layer 70 is continuously formed over both of the region where the third layer 53 of the vibration plate 50 is formed and the region where the third layer 53 is not formed.

Note that although the positions of the end portions of the third layer 53 of the vibration plate 50 in the X-axis direction are located on the extensions of the end surfaces of the piezoelectric body layer 70 in the present embodiment, the positions of the end portions of the third layer 53 do not necessarily have to be located on the extensions of the end surfaces of the piezoelectric body layer 70. The positions of the end portions of the third layer 53 in the X-axis direction may be outward of the extensions of the end surfaces of the piezoelectric body layer 70. The positions of the end portions of the third layer 53 in the X-axis direction may also be inward of the extensions of the end surfaces of the piezoelectric body layer 70.

Also, although the present embodiment shows an example configuration in which the third layer 53 is removed in the removed region A3, which is part of the inactive region A2, the range of the removed region A3 in the inactive region A2 is not limited to a particular range, and for example, the inactive region A2 and the removed region A3 may coincide. In other words, the inactive region A2 may have no third layer 53 at all formed in its entire region.

Embodiment 2

Figure 6:
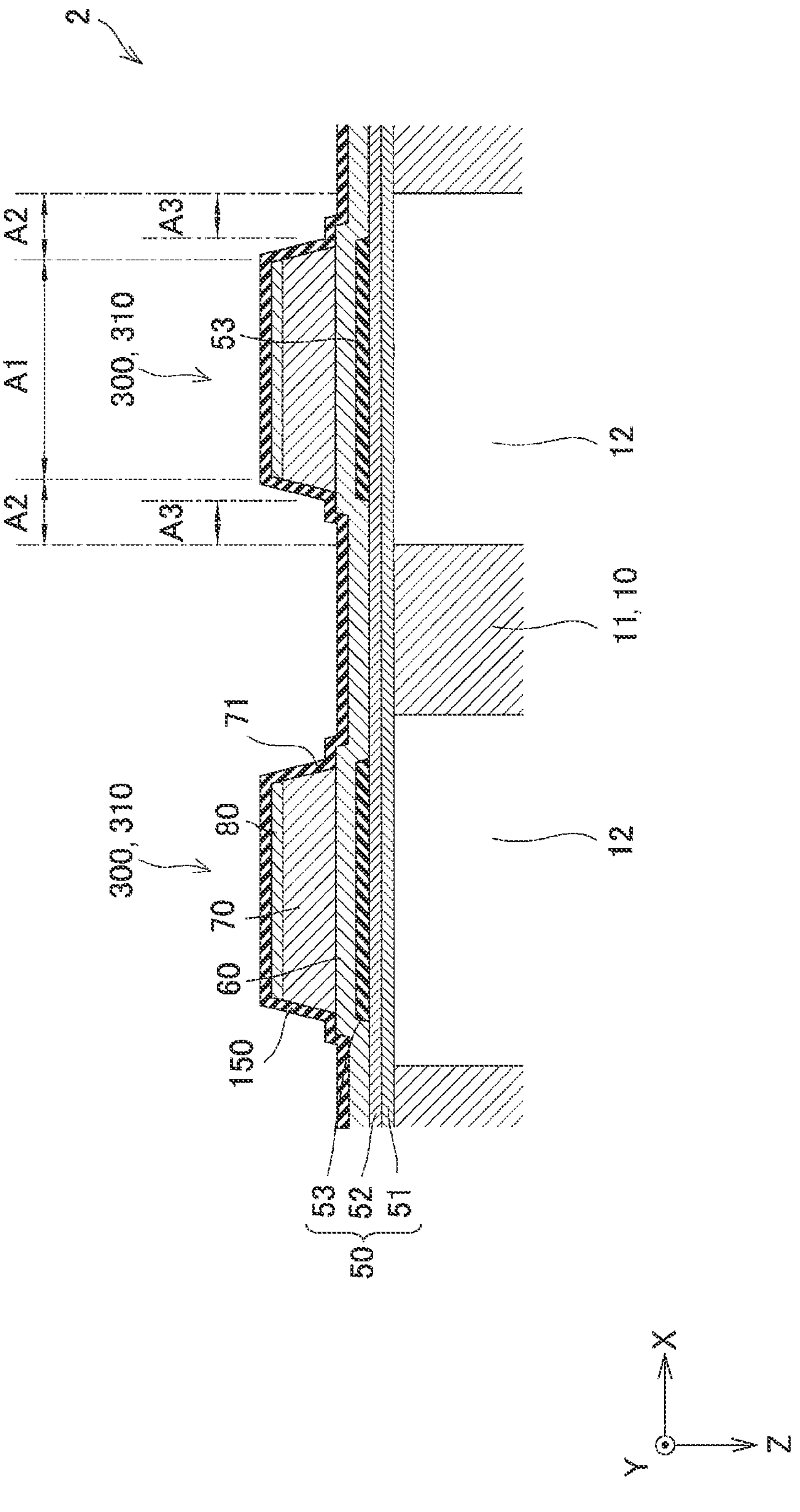
FIG. 6 is a sectional view of a recording head according to Embodiment 2.

FIG. 6 is a sectional view of a recording head according to Embodiment 2.

The present embodiment is a modification of the vibration plate 50 and the piezoelectric elements 300 that the recording head 2 includes and has a configuration similar to Embodiment 1 except for them. Note that members that are the same as those in Embodiment 1 are denoted by the same reference numerals as those used in Embodiment 1 to omit repetitive descriptions. Also, the characteristics of the recording head 2 according to the present embodiment also lie in the configuration of the vibration plate 50, and the basic configuration of the piezoelectric element 300 is an existing one.

As shown in FIG. 6, the recording head 2 according to the present embodiment includes the piezoelectric elements 300 provided on the −Z side of the vibration plate and in the piezoelectric element 300, the first electrode 60 forms a shared electrode and the second electrode 80 forms individual electrodes.

Like in Embodiment 1, the vibration plate 50 has the first layer 51, the second layer 52, and the third layer 53 which are stacked in this order in the −Z-direction, and the third layer 53 is provided not on the entire surface but on predetermined regions of the vibration plate 50. Thus, in the X-axis direction, the third layer 53 is formed with a smaller width than the pressure chamber 12.

The first electrode 60 forming the piezoelectric element 300 according to the present embodiment is provided continuously on the vibration plate 50 having the first layer 51, the second layer 52, and the third layer 53, over the regions corresponding to the plurality of pressure chambers 12, and serves as a shared electrode shared by the plurality of activation portions 310. In other words, the first electrode 60 is formed continuously on the second layer 52 and the third layer 53 of the vibration plate 50 in the X-axis direction.

The second electrode 80 is stacked on the −Z-direction side of the first electrode 60 with the piezoelectric body layer 70 interposed therebetween. The second electrode 80 is cut into pieces for the pressure chambers 12 and forms individual electrodes independently for the respective activation portions 310. The second electrode 80 is formed with a smaller width than the pressure chamber 12 in the X-axis direction. In other words, in the X-axis direction, end portions of the second electrode 80 are located inside of a region facing the pressure chamber 12. In the present embodiment, the end portions of the second electrode 80 in the X-axis direction almost coincide with the positions of the end portions of the piezoelectric body layer 70.

Also, a protection film 150 formed of an insulating material is provided on the piezoelectric element 300. Although not shown, the shared lead electrode coupled to the first electrode 60 and the individual lead electrodes coupled to the respective pieces of second electrode 80 are provided on this protection film 150.

Then, the vibration plate 50 in the recording head 2 of the present embodiment has the following configuration like in Embodiment 1. For example, in FIG. 6, a region of the vibration plate 50 that overlaps with the pressure chamber 12 and overlaps with the first electrode 60, the piezoelectric body layer 70, and the second electrode 80 when seen in the Z-axis direction, which is the first direction, is referred to as the active region A1. In other words, in a portion of the vibration plate 50 that faces the pressure chamber 12, a region overlapping with the activation portion 310 of the piezoelectric element 300 is referred to as the active region A1. Also, a region of the vibration plate 50 that overlaps with the pressure chamber 12 and does not overlap with the first electrode 60, the piezoelectric body layer 70, and the second electrode 80 when seen in the Z-axis direction is referred to as the inactive region A2. In other words, in a portion of the vibration plate 50 that faces the pressure chamber 12, a region not overlapping with the activation portion 310 of the piezoelectric element 300 is referred to as the inactive region A2. The inactive region A2 includes a region which is what is called an arm portion of the vibration plate 50, and in the present embodiment, the active region A1 is located between two inactive regions A2 when seen in a cross section in the Z-axis direction.

Also, the pressure chamber substrate 10, the vibration plate 50, the first electrode 60, the piezoelectric body layer 70, and the second electrode 80 are stacked in this order in the Z-axis direction, and the first electrode 60 as a shared electrode is provided continuously from the active region A1 to the inactive region A2 in the X-axis direction.

Then, the vibration plate 50 in the active region A1 in the X-axis direction has the first layer 51, the second layer 52, and the third layer 53. Meanwhile, the vibration plate 50 in part of the inactive region A2 in the X-axis direction has the first layer 51 and the second layer 52 but does not have the third layer 53. Specifically, the first layer 51 and the second layer 52 forming the vibration plate 50 are formed over the entire region continuously between the active region A1 and the inactive region A2, but the third layer 53 is removed in part of the inactive region A2. In other words, the third layer 53 is removed in the removed region A3 which is the partition wall 11 side of the inactive region A2, and in this removed region A3, the vibration plate 50 is formed by the first layer 51 and the second layer 52.

Advantageous effects similar to those offered by Embodiment 1 can be obtained with the configuration of the present embodiment as well. For example, the amount by which the vibration plate 50 is displaced when the piezoelectric elements 300 are driven can be improved, and at the same time, occurrence of cracking of the vibration plate 50 can be reduced. Also, because the vibration plate 50 includes the second layer 52 in the active region A1 and the inactive region A2, over-etching can be reduced in etching of the third layer 53 at the arm portion of the vibration plate 50. This helps prevent a decrease in the reliability of the vibration plate 50.

Embodiment 3

Figure 7:
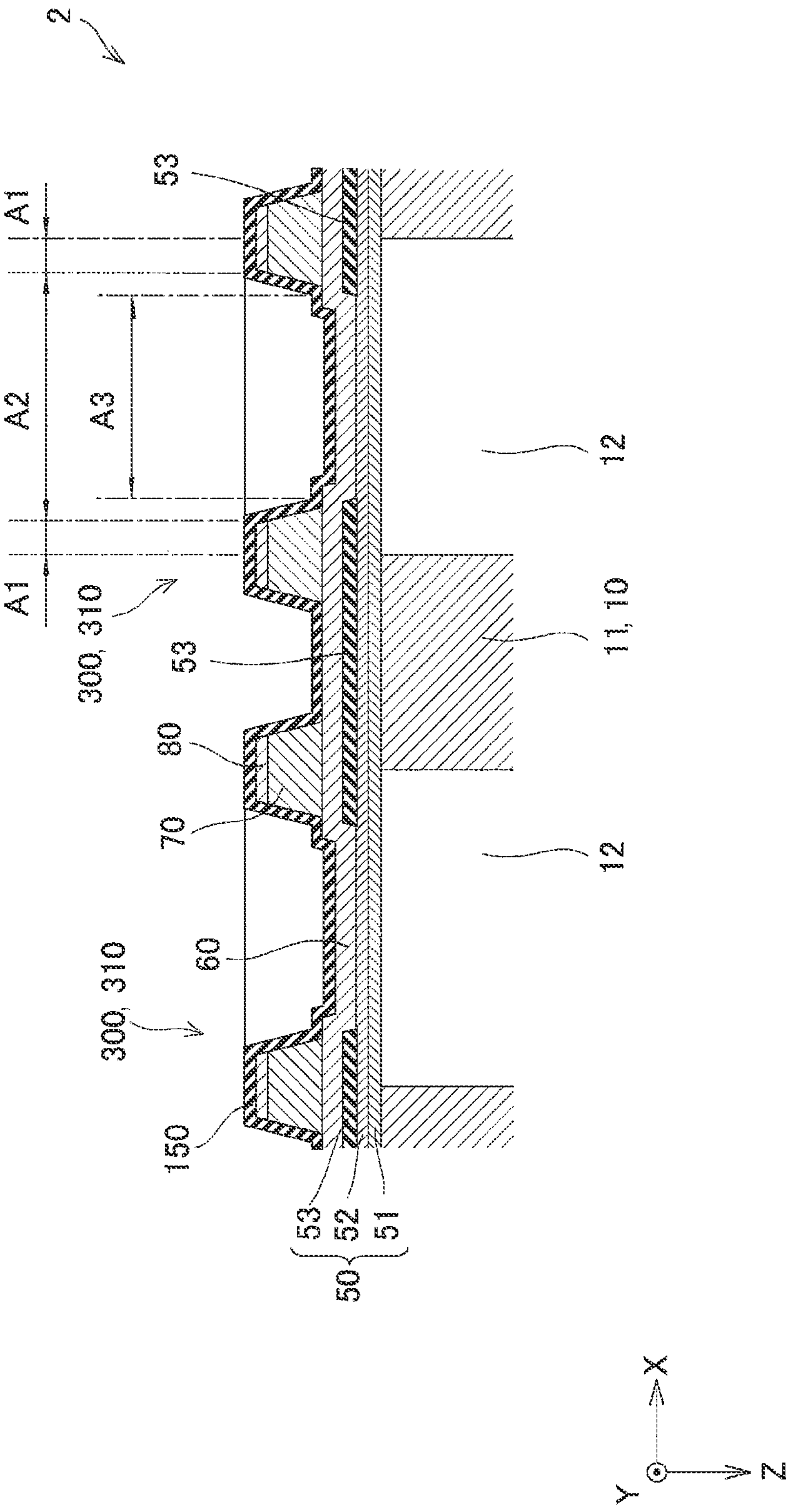
FIG. 7 is a sectional view of a recording head according to Embodiment 3.

FIG. 7 is a sectional view of a recording head according to Embodiment 3.

The present embodiment is a modification of the vibration plate 50 and the piezoelectric elements 300 that the recording head 2 includes and has a configuration similar to the above embodiments except for them. Note that members that are the same as those in Embodiment 1 are denoted by the same reference numerals as those used in Embodiment 1 to omit repetitive descriptions. Also, the characteristics of the recording head 2 according to the present embodiment also lie in the configuration of the vibration plate 50, and the basic configuration of the piezoelectric element 300 is an existing one.

As shown in FIG. 7, the piezoelectric element 300 is provided on the −Z-direction side of the pressure chamber substrate 10 with interposition of the vibration plate 50 having the first layer 51, the second layer 52, and the third layer 53 and includes the first electrode 60, the piezoelectric body layer 70, and the second electrode 80 stacked in the Z-axis direction.

Although not shown, the activation portion 310 of the piezoelectric element 300 is provided annularly extending along the opening edge portion of each pressure chamber 12 in a plan view seen in the Z-axis direction and is not provided in a center portion of the pressure chamber 12.

Thus, in a cross section in the X-axis direction shown in FIG. 7, the activation portion 310 of the piezoelectric element 300 is provided in correspondence with both of end portions of the pressure chamber 12, and not provided in a center portion of the pressure chamber 12. Note that the activation portion 310 of the piezoelectric element 300 has a similar configuration in a cross section in the Y-axis direction. In other words, at any position on the opening edge portion of the pressure chamber 12, the activation portion 310 extends from an inside of the pressure chamber 12 to an outside of the pressure chamber 12.

The first electrode 60 forming such a piezoelectric element 300 is a shared electrode shared by the plurality of activation portions 310 and is provided on the −Z-direction side of the vibration plate 50, continuously over regions corresponding to the plurality of pressure chambers 12. The piezoelectric body layer 70 is provided independently for each pressure chamber 12, i.e., for each activation portion 310. The piezoelectric body layer 70 is provided annularly with a predetermined width along the opening edge portion of the pressure chamber 12, and is not provided at a portion corresponding to a center portion of the pressure chamber 12. Note that although cut into pieces to be provided independently for the respective activation portions 310 in the present embodiment, the piezoelectric body layer 70 may be provided continuously over the plurality of activation portions 310.

The second electrode 80 is provided on a surface of the piezoelectric body layer 70 at the opposite side from the first electrode 60 and forms individual electrodes independently for the activation portions 310. In the present embodiment, the second electrode 80 is provided continuously over the piezoelectric body layer 70 forming the activation portions 310. In other words, the second electrode 80 has the same width as the piezoelectric body layer 70, is provided annularly along the opening edge portion of each pressure chamber 12, and is not provided in a portion corresponding to a center portion of the pressure chamber 12. The portion where the second electrode 80 is provided serves as the activation portion 310 of the piezoelectric element 300.

Also, the protection film 150 formed of an insulating material is provided on the piezoelectric element 300. Although not shown, the shared lead electrode coupled to the first electrode 60 and the individual lead electrodes coupled to the respective pieces of second electrode 80 are provided on this protection film 150.

In the recording head 2 according to the present embodiment, the third layer 53 forming the vibration plate is provided not on the entire surface but on predetermined regions of the vibration plate 50.

Specifically, the third layer 53 forming the vibration plate 50 is provided in regions facing the pressure chambers 12 in correspondence with the activation portions 310. In other words, inside a region facing the pressure chamber 12, the third layer 53 is provided at a position facing the circumferential edge portion of the pressure chamber 12, but not at a position facing a center portion of the pressure chamber 12.

Thus, as shown in FIG. 7, in a cross section in the X-axis direction which is the direction in which the pressure chambers 12 are arranged side by side, the third layer 53 is provided at positions corresponding to both end portions of the pressure chamber 12, not at a center portion of the pressure chamber 12. The positions of the end portions of the third layer 53 in a region facing the pressure chamber 12 are located on the extensions of the end surfaces of the piezoelectric body layer 70. Note, however, that the positions of the end portions of the third layer 53 do not have to be on the extensions of the end surfaces of the piezoelectric body layer 70, and may be inward or outward of the extensions of the end surfaces of the piezoelectric body layer 70 as long as they are inside the inactive region A2. Note that the vibration plate 50 including the third layer 53 has a similar configuration in a cross section in the Y-axis direction as well.

In the configuration of the present embodiment, a portion of the vibration plate 50 that corresponds to a center portion of the pressure chamber 12 is what is called an arm portion. In other words, in the configuration in the present embodiment as well, at what is called an arm portion of the vibration plate 50, there is a portion where the third layer 53 is not formed. This can improve the amount by which the vibration plate 50 is displaced when the piezoelectric elements 300 are driven.

Note that the third layer 53 is formed continuously in a region outside the pressure chambers 12. It goes without saying that the third layer 53 does not need to be continuous in a region outside the pressure chambers 12. For example, the third layer 53 may be removed in regions which are outside the pressure chambers 12 and where the piezoelectric body layer 70 is not formed.

Then, in the present embodiment as well, the vibration plate 50 including this third layer 53 is, in other words, configured as follows. For example, in FIG. 7, a region of the vibration plate 50 that overlaps with the pressure chamber 12 and overlaps with the first electrode the piezoelectric body layer 70, and the second electrode 80 when seen in the Z-axis direction, which is the first direction, is referred to as the active region A1. In other words, in a portion of the vibration plate 50 that faces the pressure chamber 12, a region overlapping with the activation portion 310 of the piezoelectric element 300 is referred to as the active region A1. Also, a region of the vibration plate 50 that overlaps with the pressure chamber 12 and does not overlap with the first electrode 60, the piezoelectric body layer 70, and the second electrode 80 when seen in the Z-axis direction is referred to as the inactive region A2. In other words, in a portion of the vibration plate 50 that faces the pressure chamber 12, a region not overlapping with the activation portion 310 of the piezoelectric element 300 is referred to as the inactive region A2. Thus, in the present embodiment, in a portion of the vibration plate 50 that faces the pressure chamber 12, a region facing a center portion of the pressure chamber 12 is the inactive region A2, and the inactive region A2 is located between two active regions A1 when seen in a cross section in the Z-axis direction.

Also, in the present embodiment, the pressure chamber substrate 10, the vibration plate 50, the first electrode 60, the piezoelectric body layer 70, and the second electrode 80 are stacked in this order in the Z-axis direction, and the first electrode 60 as a shared electrode is provided continuously from the active region A1 to the inactive region A2.

Then, the vibration plate 50 in the active region A1 has the first layer 51, the second layer 52, and the third layer 53. Meanwhile, the vibration plate 50 in the inactive region A2 has first layer 51 and the second layer 52 but does not have the third layer 53. In other words, the first layer 51 and the second layer 52 forming the vibration plate 50 are formed continuously over the entire region between the active region A1 and the inactive region A2, whereas the third layer 53 is removed in at least part of the inactive region A2. Thus, the third layer 53 is removed in the removed region A3, which is a center portion of the inactive region A2 excluding the outer circumferential portion, and the vibration plate 50 in the removed region A3 is formed by the first layer 51 and the second layer 52.

Advantageous effects similar to those offered by the above embodiments can be obtained with the configuration of the present embodiment as well. For example, the amount by which the vibration plate 50 is displaced when the piezoelectric elements 300 are driven can be improved, and at the same time, occurrence of cracking of the vibration plate 50 can be reduced. Also, because the vibration plate includes the second layer 52 in the active region A1 and the inactive region A2, over-etching can be reduced in etching of the third layer 53 at portions of the vibration plate 50 that correspond to the center portions of the pressure chambers 12, i.e., the arm portions of the vibration plate 50. This helps prevent a decrease in the reliability of the vibration plate 50.

Other Embodiments

Although embodiments of the present disclosure are described above, the basic configuration of the present disclosure is not limited to the ones described above.

For example, although a configuration in which the vibration plate 50 includes the first layer 51, the second layer 52, and the third layer 53 was shown as an example in the embodiments described above, the configuration of the vibration plate 50 is not limited to this. The vibration plate 50 may be configured including a layer other than the first layer 51, the second layer 52, and the third layer 53. For example, the vibration plate 50 may include a fourth layer as a stress control layer between the first layer 51 and the second layer 52.

Also, although the present disclosure has been described in the above embodiments by showing examples of the configuration of the vibration plate 50 in terms of the shorter-side direction of the pressure chamber 12, it goes without saying that the present disclosure can be applied to the configuration of the vibration plate 50 in terms of the longer-side direction of the pressure chamber 12.

Also, although the embodiments described above have shown examples of the recording apparatus 1 in which the recording head 2 is mounted to the transport body 8 and reciprocates along the Y-axis, which is the main scan direction, the configuration of the recording apparatus 1 is not limited to this. For example, as the recording apparatus 1, the present disclosure can also be applied to what is called a line-type recording apparatus which has a stationary recording head 2 and performs printing only by moving the medium S such as paper along the X-axis, which is the sub scanning direction.

Note that although the present disclosure was described using an ink jet recording head as an example of a liquid ejecting head and an ink jet recording apparatus as an example of a liquid ejecting apparatus, the present disclosure targets a wide variety of liquid ejecting heads and liquid ejecting apparatuses. It goes without saying that the present disclosure can also be applied to liquid ejecting heads and liquid ejecting apparatuses that eject liquid other than ink. Examples of other liquid ejecting heads include various kinds of recording heads used for an image recording apparatus such as a printer, color material ejecting heads used for manufacturing of color filters of liquid crystal displays or the like, electrode material ejecting heads used for electrode formation for, organic EL displays, field emission displays (FEDs), or the like, and bioorganic substance ejecting heads used for biochip manufacturing. Also, the present disclosure can also be applied to liquid ejecting apparatuses including such liquid ejecting heads.

Also, the present disclosure is not limited to a liquid ejecting head typified by an ink jet recording head, and can also be applied to a piezoelectric device such as an ultrasonic device, a motor, a pressure sensor, a pyroelectric element, or a ferroelectric element. Also, the present disclosure can also be applied to completed forms using these piezoelectric devices, for example, in addition to liquid or non-liquid ejecting apparatuses using the above-described liquid or non-liquid ejecting heads, an ultrasonic sensor using the above-described ultrasonic device, a robot using the above-described motor as a driving source, an IR sensor using the above-described pyroelectric element, a ferroelectric memory using the ferroelectric element, or the like.

What is claimed is:

1. A liquid ejecting head comprising:

a piezoelectric element including a first electrode, a piezoelectric body layer, and a second electrode stacked in a first direction;

a vibration plate vibrated by driving of the piezoelectric element; and a pressure chamber substrate that defines a pressure chamber where pressure is applied to a liquid by vibration of the vibration plate, wherein the pressure chamber substrate, the vibration plate, and the piezoelectric element are stacked in this order in the first direction, the vibration plate includes a first layer containing silicon as a constituent element, a second layer disposed between the first layer and the piezoelectric body layer and containing a metal element other than zirconium as a constituent element, and a third layer disposed between the second layer and the piezoelectric body layer and containing zirconium as a constituent element, and when a portion of the piezoelectric element where the piezoelectric body layer is sandwiched by the first electrode and the second electrode in the first direction is an activation portion, when a region of the vibration plate that overlaps with the pressure chamber and the activation portion when seen in the first direction is an active region, and when a region of the vibration plate that overlaps with the pressure chamber and does not overlap with the activation portion when seen in the first direction is an inactive region, the vibration plate has the first layer, the second layer, and the third layer in the active region, and has the first layer and the second layer and does not have the third layer in at least part of the inactive region, and in at least part of the inactive region, the second layer of the vibration plate is stacked adjacent to one of the first electrode and the second electrode.

2. The liquid ejecting head according to claim 1, wherein the second layer is formed continuously between the active region and the inactive region.

3. The liquid ejecting head according to claim 1, wherein a material of the second layer has a higher Young's modulus than a material of the first layer.

4. The liquid ejecting head according to claim 1, wherein the second layer contains a metal element which is any one of titanium, aluminum, chrome, and tantalum as a constituent element.

5. The liquid ejecting head according to claim 1, wherein the second layer contains, as a constituent element, a metal element which is more resistant to oxidation than zirconium.

6. The liquid ejecting head according to claim 1, wherein a constituent element of the one electrode stacked adjacent to the second layer of the vibration plate contains the metal element contained in the second layer.

7. The liquid ejecting head according to claim 6, wherein the one electrode stacked adjacent to the second layer of the vibration plate contains the metal element as a single element, and the second layer contains an oxide or nitride of the metal element.

8. The liquid ejecting head according to claim 1, wherein a region of the inactive region that overlaps with the pressure chamber when seen in the first direction and does not have the third layer does not overlap with the piezoelectric body layer when seen in the first direction.

9. The liquid ejecting head according to claim 1, wherein when seen in a cross section in the first direction, the active region is located between two of the inactive regions.

10. The liquid ejecting head according to claim 9, wherein the pressure chamber substrate, the vibration plate, the first electrode, the piezoelectric body layer, and the second electrode are stacked in this order in the first direction, and the second electrode is provided continuously from the active region to the inactive region.

11. A liquid ejecting head comprising:

a piezoelectric element including a first electrode, a piezoelectric body layer, and a second electrode stacked in a first direction;

a vibration plate vibrated by driving of the piezoelectric element; and a pressure chamber substrate that defines a pressure chamber where pressure is applied to a liquid by vibration of the vibration plate, wherein the pressure chamber substrate, the vibration plate, and the piezoelectric element are stacked in this order in the first direction, the vibration plate includes a first layer containing silicon as a constituent element, a second layer disposed between the first layer and the piezoelectric body layer and containing a metal element other than zirconium as a constituent element, and a third layer disposed between the second layer and the piezoelectric body layer and containing zirconium as a constituent element, and when a portion of the piezoelectric element where the piezoelectric body layer is sandwiched by the first electrode and the second electrode in the first direction is an activation portion, when a region of the vibration plate that overlaps with the pressure chamber and the activation portion when seen in the first direction is an active region, and when a region of the vibration plate that overlaps with the pressure chamber and does not overlap with the activation portion when seen in the first direction is an inactive region, the vibration plate has the first layer, the second layer, and the third layer in the active region, and has the first layer and the second layer and does not have the third layer in at least part of the inactive region, when seen in a cross section in the first direction, the active region is located between two of the inactive regions, the pressure chamber substrate, the vibration plate, the first electrode, the piezoelectric body layer, and the second electrode are stacked in this order in the first direction, and the first electrode is provided continuously from the active region to the inactive region.

12. The liquid ejecting head according to claim 1, wherein when seen in a cross section in the first direction, the inactive region is located between two of the active regions.

13. A liquid ejecting apparatus comprising the liquid ejecting head according to claim 1.

14. A piezoelectric device comprising:

a substrate having a concave portion;

a piezoelectric element including a first electrode, a piezoelectric body layer, and a second electrode stacked in a first direction; and a vibration plate vibrated by driving of the piezoelectric element, wherein the substrate, the vibration plate, and the piezoelectric element are stacked in this order in the first direction, the vibration plate includes a first layer containing silicon as a constituent element, a second layer disposed between the first layer and the piezoelectric body layer and containing a metal element other than zirconium as a constituent element, and a third layer disposed between the second layer and the piezoelectric body layer and containing zirconium as a constituent element, and when a portion of the piezoelectric element where the piezoelectric body layer is sandwiched by the first electrode and the second electrode in the first direction is an activation portion, when a region of the vibration plate that overlaps with the concave portion and overlaps with the activation portion when seen in the first direction is an active region, and when a region of the vibration plate that overlaps with the concave portion and does not overlap with the activation portion when seen in the first direction is an inactive region, the vibration plate has the first layer, the second layer, and the third layer in the active region and has the first layer and the second layer and does not have the third layer in at least part of the inactive region, and in at least part of the inactive region, the second layer of the vibration plate is stacked adjacent to one of the first electrode and the second electrode.

15. The liquid ejecting head according to claim 1, wherein in the at least part of the inactive region, the second electrode is stacked on the second layer.

16. The liquid ejecting head according to claim 1, wherein in the at least part of the inactive region, the first electrode is stacked on the second layer.

17. The piezoelectric device according to claim 14, wherein in the at least part of the inactive region, the second electrode is stacked on the second layer.

18. The piezoelectric device according to claim 14, wherein in the at least part of the inactive region, the first electrode is stacked on the second layer.

19. The piezoelectric device according to claim 17, wherein a constituent element of the second electrode stacked on the second layer of the vibration plate contains the metal element contained in the second layer.

20. The piezoelectric device according to claim 14, wherein a peripheral edge of the third layer contacts the second electrode.

* * * * *